United States Patent
Yin (10) Patent No.: US 10,095,715 B2
(45) Date of Patent: Oct. 9, 2018

(54) DATA BACKUP AND RECOVERY METHOD FOR MOBILE TERMINAL AND MOBILE TERMINAL

(71) Applicant: HUAWEI DEVICE (DONGGUAN) CO., LTD., Dongguan (CN)

(72) Inventor: Wei Yin, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 852 days.

(21) Appl. No.: 14/057,337

(22) Filed: Oct. 18, 2013

(65) Prior Publication Data
US 2014/0046903 A1 Feb. 13, 2014

Related U.S. Application Data (63) Continuation of application No. PCT/CN2011/073015, filed on Apr. 19, 2011.

(51) Int. Cl.
| | | |
|---|---|---|
| G06F 17/30 | (2006.01) | |
| H04W 8/30 | (2009.01) | |
| G06F 11/14 | (2006.01) | |
| G06F 21/00 | (2013.01) | |
| G06F 21/31 | (2013.01) | |

(Continued)

(52) U.S. Cl.
CPC .... *G06F 17/30289* (2013.01); *G06F 11/1464* (2013.01); *G06F 11/1469* (2013.01); *G06F 21/00* (2013.01); *G06F 21/31* (2013.01); *H04W 8/30* (2013.01); *G06F 2221/2131* (2013.01); *H04L 63/083* (2013.01);

(Continued)

(58) Field of Classification Search
CPC ............. G06F 11/1464; G06F 11/1469; G06F 17/30289; G06F 21/00; G06F 21/31; G06F 2221/2131; H04L 63/083; H04M 2201/12; H04M 2203/554; H04W 8/24; H04W 8/30
See application file for complete search history.

(56) References Cited

U.S. PATENT DOCUMENTS

| | | | | |
|---|---|---|---|---|
| 5,404,508 A | * | 4/1995 | Konrad | G06F 11/2038 |
| | | | | 707/640 |
| 5,504,883 A | * | 4/1996 | Coverston | G06F 11/1458 |
| | | | | 707/640 |

(Continued)

FOREIGN PATENT DOCUMENTS

| | | |
|---|---|---|
| CN | 1633086 A | 6/2005 |
| CN | 101183323 A | 5/2008 |

(Continued)

OTHER PUBLICATIONS

International Search Report dated Mar. 1, 2012, in corresponding International Patent Application No. PCT/CN2011/073015.

(Continued)

*Primary Examiner* — Ashish K Thomas
*Assistant Examiner* — Mellissa M Ohba
(74) *Attorney, Agent, or Firm* — Staas & Halsey LLP (57) ABSTRACT

A data backup method for a mobile terminal and a mobile terminal including the same. The method includes: receiving a data backup request; backing up information data by blocks and generating backup data of each block; scanning the backup data of each block and generating corresponding statistics information; and storing the backup data and the statistics information of each block.

19 Claims, 7 Drawing Sheets

(51) Int. Cl.
*H04W 8/24* (2009.01)
*H04L 29/06* (2006.01)
(52) U.S. Cl.
CPC .. *H04M 2201/12* (2013.01); *H04M 2203/554* (2013.01); *H04W 8/24* (2013.01)

(56) References Cited

U.S. PATENT DOCUMENTS

| | | | | |
|---|---|---|---|---|
| 6,732,293 | B1* | 5/2004 | Schneider | G06F 11/1435 707/999.202 |
| 7,065,539 | B2* | 6/2006 | Mikami | G06F 11/0727 |
| 8,200,736 | B2 | 6/2012 | Shi et al. | 709/200 |
| 8,635,661 | B2* | 1/2014 | Shahbazi | H04L 63/083 380/270 |
| 8,881,266 | B2* | 11/2014 | Chow | G06F 21/31 713/168 |
| 9,392,462 | B2* | 7/2016 | Raleigh | H04W 12/08 |
| 2003/0097533 | A1* | 5/2003 | Maeda | G06F 11/1466 711/162 |
| 2005/0050117 | A1* | 3/2005 | Seo | H04L 67/1095 |
| 2005/0055521 | A1* | 3/2005 | Saika | G06F 11/1032 711/162 |
| 2005/0171997 | A1* | 8/2005 | Seo | H04M 1/72525 709/202 |
| 2006/0218203 | A1* | 9/2006 | Yamato | G06F 11/2082 |
| 2007/0050573 | A1* | 3/2007 | Arakawa | G06F 11/2058 711/162 |
| 2007/0099610 | A1* | 5/2007 | Kim | H04W 8/24 455/432.2 |
| 2007/0207729 | A1* | 9/2007 | Chen | G06F 17/3056 455/15 |
| 2007/0286099 | A1* | 12/2007 | Stocklein | H04L 67/22 370/259 |
| 2008/0022096 | A1* | 1/2008 | Kamio | G11B 20/00086 713/165 |
| 2008/0059736 | A1* | 3/2008 | Murayama | G06F 11/1451 711/162 |
| 2008/0167027 | A1* | 7/2008 | Gautier | H04W 8/265 455/419 |
| 2009/0163175 | A1* | 6/2009 | Shi | H04W 8/205 455/411 |

FOREIGN PATENT DOCUMENTS

| | | |
|---|---|---|
| CN | 101290628 A | 10/2008 |
| CN | 101370305 A | 2/2009 |
| CN | 101933346 A | 12/2010 |
| EP | 2076071 | 7/2009 |

OTHER PUBLICATIONS

Chinese Search Report dated Sep. 25, 2013, in corresponding Chinese Patent Application No. 201180000472.1.
Chinese Office Action dated Oct. 9, 2013, in corresponding Chinese Patent Application No. 201180000472.1.

* cited by examiner

FIG. 11

DATA BACKUP AND RECOVERY METHOD FOR MOBILE TERMINAL AND MOBILE TERMINAL

CROSS-REFERENCE TO RELATED APPLICATIONS

This application is a continuation of International Application No. PCT/CN2011/073015, filed on Apr. 19, 2011, which is hereby incorporated by reference in its entireties.

TECHNICAL FIELD

The present invention relates to the mobile communication field, and in particular, to a data backup and recovery method for a mobile terminal and a mobile terminal.

BACKGROUND

To prevent information data loss, most of current mobile terminals are capable of implementing information data backup and recovery functions, but if no confidentiality processing is performed on information data backup and recovery, personal privacy information is quite easily to be disclosed. In the prior art, secrecy processing is generally performed in a manner of setting a password for a backup file. However, if a user fails to find a password of a backup file due to a reason like that the password of the backup file was set a long time ago, it is difficult to recover information data of the backup file. But if no password is set, information security cannot be ensured.

SUMMARY

Embodiments of the present invention disclose a data backup and recovery method for a mobile terminal and a mobile terminal, so that a user recovers data by blocks according to user's familiarity with data backup, which effectively ensures information security.

An embodiment of the present invention discloses a data backup method for a mobile terminal, where the method includes:

receiving a data backup request;

backing up information data by blocks, and generating backup data of each block;

scanning the backup data of each block, and generating corresponding statistics information; and storing the backup data and the statistics information of each block.

An embodiment of the present invention discloses a data recovery method for a mobile terminal, where the method includes:

receiving a data recovery request;

asking, according to statistics information generated during data backup by blocks, a question for backup data of each block, where the backup data of each block is generated during data backup by blocks; and receiving an answer to the question and comparing the answer with corresponding statistics information, and if they match, performing a recovery operation on corresponding backup data.

An embodiment of the present invention discloses a mobile terminal, including:

a backup device, configured to obtain information data from a main chip of the mobile terminal, and back up the information data by blocks and generate backup data of each block;

a statistics device, configured to scan the backup data of each block and generate statistics information;

a storage, configured to store the backup data and the statistics information of each block; and an input and output apparatus, configured to receive a data backup request and send the data backup request to the backup device.

An embodiment of the present invention discloses a mobile terminal, including:

a questioning device, configured to ask, according to statistics information generated during data backup by blocks, a question for backup data of each block, where the backup data of each block is generated during data backup by blocks, and receive an answer to the question through an input and output apparatus and compare the answer with corresponding statistics information, and if they match, send a data recovery instruction for backup data of a corresponding module to a recovery device;

the recovery device, configured to, when receiving the data recovery instruction, perform a recovery operation on the corresponding backup data stored in a storage;

the storage, configured to store the backup data and the statistics information of each block, and provide the statistics information for the questioning device; and the input and output apparatus, configured to receive a data recovery request and send the data recovery request to the questioning device, and interact with a user regarding related questioning information.

An embodiment of the present invention discloses a mobile terminal, including:

a backup device, configured to obtain information data from a main chip of the mobile terminal, and back up the information data by blocks and generate backup data of each block;

a statistics device, configured to scan the backup data of each block and generate statistics information;

a storage, configured to store the backup data and the statistics information of each block;

a questioning device, configured to ask, according to the statistics information, a question for the backup data of each block, receive an answer to the question through an input and output apparatus and compare the answer with corresponding statistics information, and if they match, send a data recovery instruction for backup data of a corresponding module to a recovery device;

the recovery device, configured to, when receiving the data recovery instruction, perform a recovery operation on the corresponding backup data stored in the storage; and the input and output apparatus, configured to receive a data backup request and send the data backup request to the backup device, receive a data recovery request and send the data recovery request to the questioning device, and interact with a user regarding related questioning information.

By applying the data backup and recovery method for a mobile terminal and the mobile terminal disclosed by the embodiments of the present invention, a user may recover data by blocks according to user's familiarity with data backup, which effectively ensures information security. In addition, the data may also be recovered in a case that a password is forgotten and cannot be found, or fingerprint password verification fails or the like, so as to prevent a situation of permanent loss of information data from occurring.

BRIEF DESCRIPTION OF DRAWINGS

Accompanying drawings described herein are provided for further understanding of the present invention, and are a part of the application, but are not intended to limit the present invention. In the drawings.

DESCRIPTION OF EMBODIMENTS

To make the objectives, technical solutions, and advantages of the present invention more comprehensible, the following further describes the present invention in detail with reference to the implementation manners and the accompanying drawings. Herein, the exemplary implementation manners of the present invention and their descriptions are merely provided for explaining the present invention, instead of limiting the present invention.

First, it should be noted that a mobile terminal described in the embodiments of the present invention includes, but is not limited to, a cell phone, a data card, and a palmtop computer; data includes, but is not limited to, contact persons, call records, short messages, Internet records, mailboxes, multimedia messages, and setting parameters.

Method Embodiment

Figure 1:
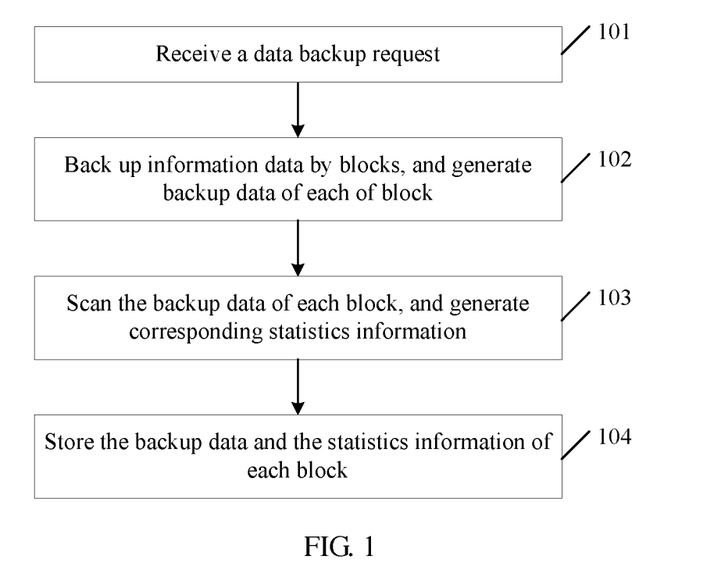
FIG. 1 is a flowchart of a data backup method for a mobile terminal according to an embodiment of the present invention.

Referring to FIG. 1, an embodiment of the present invention provides a data backup method for a mobile terminal, where the method includes the following steps:

Step 101: Receive a data backup request.

Step 102: Back up information data by blocks, and generate backup data of each block.

Specifically, after receiving the data backup request from a user, a mobile terminal may divide its information data into a plurality of modules, such as contact persons, call records, short messages, Internet records, mailboxes, multimedia messages, and setting parameters, and store the information data as backup data files by modules, such as database (Database, db) files. A rule for dividing data into blocks may be initially set by the mobile terminal, and a more optimized manner is that the mobile terminal may define a range of each information module according to a user's habit and requirement, and that which part of information data needs to be backed up and which part of information data does not need to be backed up may both be defined by the user and be implemented by the mobile terminal. For instance, the mobile terminal may be set to back up information data of a contact person module and a short message module, and information data of other modules is not backed up. In this way, the user can back up information data according to a user's requirement.

Step 103: Scan the backup data of each block, and generate corresponding statistics information.

After a backup data file of each block is generated, the mobile terminal scans all the backup data files, and automatically generates some statistics information, and specifically, the statistics information may be:

contact persons: a contact person that is mostly contacted; the number of contact persons; groups which exist, and so on;

short messages: persons that short message interaction involves; persons that short message interaction mostly involves, and so on;

call records: a contact person with whom a call duration is the longest; time of a latest call record, and so on;

Internet records: most frequently visited websites; stored bookmarks, and so on;

mailboxes: a website to which a mailbox account belongs; a password of a certain mailbox account, and so on;

multimedia messages: the latest video recording time and duration; the number of the saved pictures, and so on; and setting parameters: preset time of an alarm clock, and so on.

The statistics information may be stored in a form of key-value pairs as extensible markup language (Extensible Markup Language, xml) files, hyper text mark-up language (Hyper Text Mark-up Language, html) files and other files that can record text information, and a more optimized manner is that a priority level may be defined for the statistics information according to importance of the statistics information, so as to facilitate asking of a question according to a sequence of the priority level during data recovery. A manner for storing the statistics information is not fixed, and a specific character strings may be as follows:

```
    ...
    <question_info label="allmodule" total="10">
        <module name="contact">
            <question name="a contact person that is mostly contacted"
                answer="Zhang San. 13100000000; ..."
                priorty="1">
            </question>
            <question name="the number of contact persons"
                answer="100"
                priorty="2">
        </question>
        </module>
    <module name="message">
    ...
```

Following a question-info label, the total number of backup units is listed. Statistics information of each module corresponds to one module label, and each question label represents a question, where the question includes three parts, name, answer, and priority: name indicates a question name displayed for a user to see, answer indicates a correct answer to a corresponding question, and priority indicates a priority level of the statistics information. For instance, a module shown in the figure is contact, namely, a contact person module, and question name, namely, a question name, is "a contact person that is mostly contacted"; answer, namely, a correct answer to a corresponding question, is "Zhang San, 13100000000; . . . "; and priority indicates that a priority level of the question is "1". The priority level may be preset by the mobile terminal, and may also be defined by the user.

Step 104: Store the backup data and the statistics information of each block.

Specifically, the mobile terminal may store the backup data of each block and the statistics information of each block as a backup file package. The backup file package may be a zip file package, whose file structure may be shown in FIG. 3, and the backup file package may be named backup.zip, and includes several db files, such as contact.db, email.db, and bookmark.db, which correspond to the backup data of each block, and further includes a configuration file info.xml, which corresponds to the statistics information of each block. Another method is that the mobile terminal separately stores the backup data and the statistics information.

Figure 2:
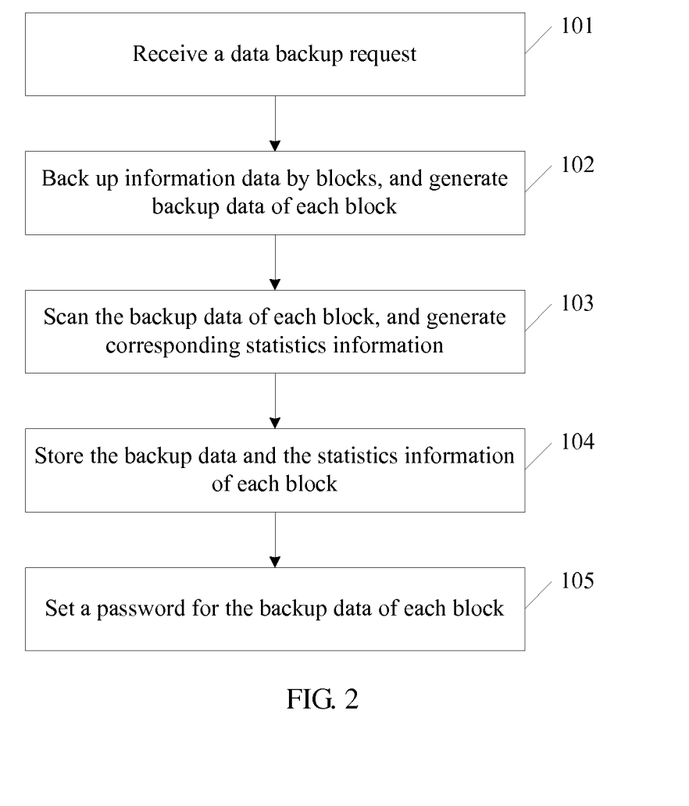
FIG. 2 is a flowchart of another data backup method for a mobile terminal according to an embodiment of the present invention.

Optionally, referring to FIG. 2, the mobile terminal may also perform password protection on the backup data of each block. After the backup data of each block is generated, or the backup data of each block is scanned, or the backup data and the statistics information of each block are stored, the method may further include:

Step 105: Set a password for the backup data of each block.

Specific time for setting a password for the backup data of each block in step 105 may be after step 102 in which the backup data of each block is generated, and the password is directly set for the backup data; may also be after step 103 in which the backup data of each block is scanned; and may further be after step 104 in which the backup data and the statistics information of each block are stored. In FIG. 2, that a password is set after step 104 in which the backup data and the statistics information of each block are stored is taken as an example. The password may be automatically set by the mobile terminal and notified to the user, and may also be set according to a user's input. The password may be any password form that is technically implementable at present, such as numerals, characters, letters, fingerprints, and any combination of the foregoing several passwords.

In the embodiment of the present invention, after receiving a data backup request, a mobile terminal divides data information that needs to be backed up into several modules, and generates statistics information after generating backup data of each block, where the statistics information is a question and an answer based on the backup data, and in addition, stores the backup data and the statistics information, and meanwhile, may set a password to protect the backup data, so that a method for data backup by blocks is provided and a user may select, according to a user's requirement, data that needs to be backed up for backup.

Figure 4:
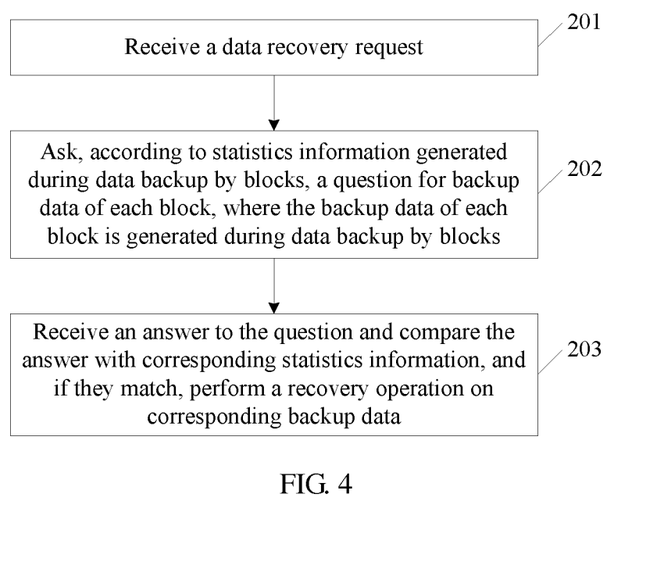
FIG. 4 is a flowchart of a data recovery method for a mobile terminal according to an embodiment of the present invention.

Referring to FIG. 4, an embodiment of the present invention further provides a data recovery method for a mobile terminal, where the method includes the following steps:

Step 201: Receive a data recovery request.

Step 202: Ask, according to statistics information generated during data backup by blocks, a question for backup data of each block, where the backup data of each block is generated during data backup by blocks.

The statistics information generated during data backup by blocks and the backup data generated during data backup by blocks in this step have been illustrated in the previous embodiment, and are not described herein again. Specifically, after receiving a request for recovering a backup file, a mobile terminal extracts the previously stored statistics information, and questions a user by blocks according to a certain sequence, where the certain sequence may be a sequence of a priority level set for the backup data of each block during data backup. Further, the certain sequence may also be determined by the user. For instance, before a question is asked, a backup data list is displayed to the user, and the user selects a backup data module that needs to be recovered and correspondingly selects a sequence for answering the question. In this way, the user may only recover the backup data module that needs to be recovered, and may not recover other backup data modules that do not need to be recovered or are inconvenient for recovery, which improves operability of the solution.

Step 203: Receive an answer to the question and compare the answer with corresponding statistics information, and if they match, perform a recovery operation on corresponding backup data.

Figure 5:
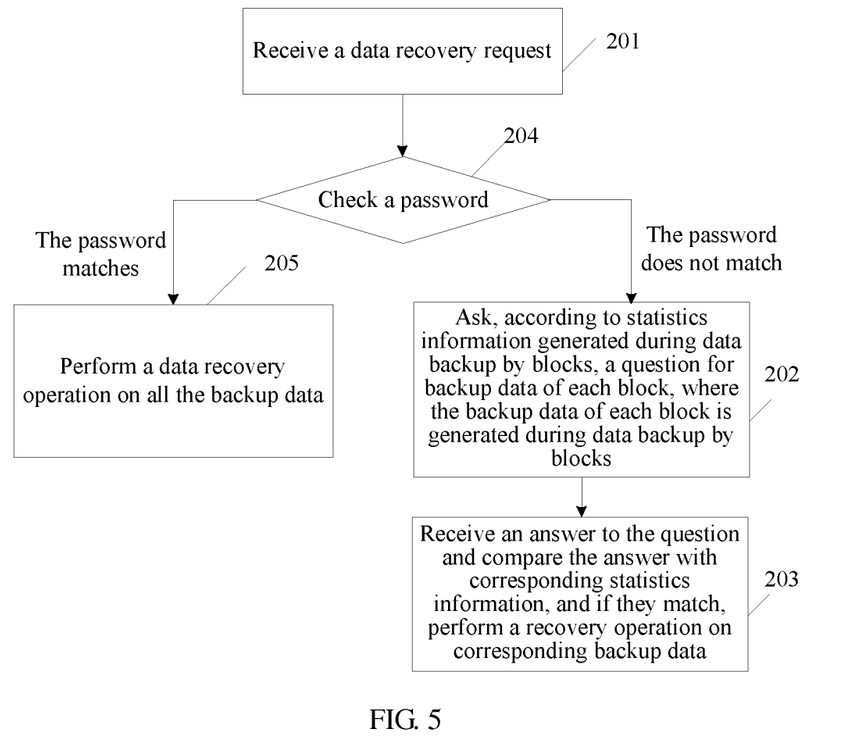
FIG. 5 is a flowchart of another data recovery method for a mobile terminal according to an embodiment of the present invention.

By checking the answer to the question entered by the user, once the mobile terminal finds that the answer is consistent with an answer to the question in the statistics information, the mobile terminal starts a backup data recovery function, releases and recovers backup data of a corresponding module in the backup data. Optionally, if the mobile terminal sets a password for the backup data during data backup, referring to FIG. 5, the method further includes:

After step 201 in which a data recovery request is received, and before step 202 in which a question is asked for backup data of each block, the method further includes:

Step 204: Check a password.

Step 205: If the password matches, perform a data recovery operation on all the backup data.

The mobile terminal interacts with the user to compare a password entered by the user and the password set for the backup data during data backup to check whether they match. If it is found that the password and a password of a backup file package match, the backup data recovery operation is started, and backup data in the backup file package is released and recovered.

If the passwords do not match, perform step 202 to ask a question for the backup data of each block according to the statistics information. Descriptions of the following steps are consistent with those following step 202 in the foregoing embodiment, and are not described herein again.

In the embodiment of the present invention, in a case that data is backed up by blocks and backup data and statistics information of each block are generated, while a user fails to recover a backup file by entering a password, a mobile terminal separately asks a question to the user according to statistics information of different modules, and separately recovers corresponding backup data according to correctness of a user's answer to each question, which prevents a situation that backup data cannot be recovered because, for example, a password is forgotten and cannot be found, or fingerprint password verification fails, from occurring, and meanwhile, improves security of the backup data of the mobile terminal.

Mobile Terminal Embodiment

Figure 6:
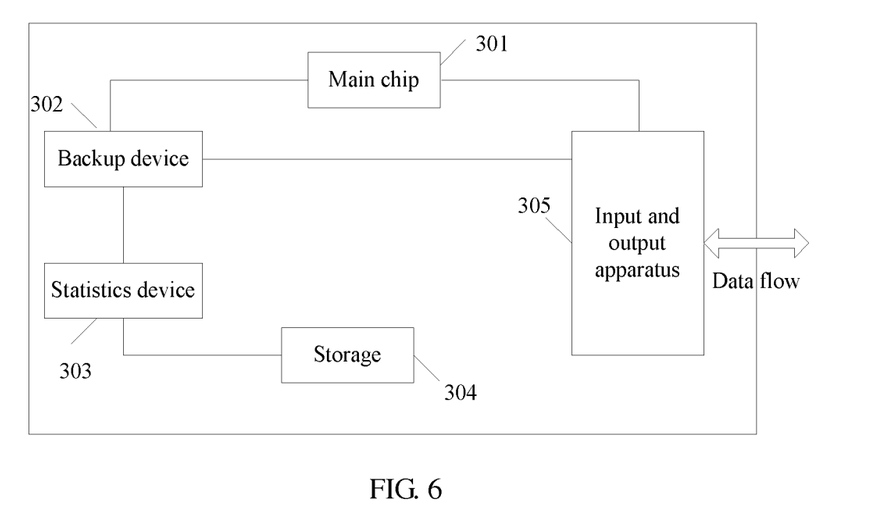
FIG. 6 is a schematic structural diagram of another mobile terminal according to an embodiment of the present invention.

Referring to FIG. 6, an embodiment of the present invention further provides a mobile terminal, where the mobile terminal includes, but is not limited to, a cell phone, a data card, and a palmtop computer, and includes:

A main chip 301 is configured to provide information data that needs to be backed up for a backup device, and implement a basic function of the mobile terminal.

The backup device 302 is configured to obtain the information data from the main chip of the mobile terminal, and back up the information data by blocks and generate backup data of each block. Specifically, after receiving a backup request from a user, the backup device 302 may divide the information data of the mobile terminal into a plurality of modules, such as contact persons, call record blocks, short messages, Internet records, mailboxes, multimedia messages, and setting parameters, and store the information data as backup data files by modules, such as db files. A more optimized manner is that the backup device 302 may define a range of each information module according to a user's habit and requirement, and that which part of the information data needs to be backed up and which part of the information data does not need to be backed up may both be defined by the user and be implemented by the backup device 302. For instance, the mobile terminal may be set to back up information data of a contact person module and a short message module, and information data of other modules is not backed up. In this way, the user can back up information data according to a user's requirement.

A statistics device 303 is configured to scan the backup data of each block and generate the statistics information of each block.

After a backup data file of each block is generated, the statistics device 303 scans all the backup data files generated by the backup device 302 and automatically generates some statistics information, where the statistics information of each block includes a question and an answer based on the backup data of each block. Specifically, according to properties of different modules, the statistics information may be:

contact persons: a contact person that is mostly contacted; the number of contact persons; groups which exist, and so on;

short messages: persons that short message interaction involves; persons that short message interaction mostly involves, and so on;

call records: a contact person with whom a call duration is the longest; time of a latest call record, and so on;

Internet records: most frequently visited websites; stored bookmarks, and so on;

mailboxes: a website to which a mailbox account belongs; a password of a certain mailbox account, and so on;

multimedia messages: the latest video recording time and duration; the number of the saved pictures, and so on; and setting parameters: preset time of an alarm clock, and so on.

The statistics device 303 may store the statistics information in a form of key-value pairs as extensible markup language (Extensible Markup Language, xml) files, hyper text mark-up language (Hyper Text Mark-up Language, html) files and other files that can record text information, and a more optimized manner is that the statistics device 303 may define a priority level for the statistics information according to importance of the statistics information. A manner for the statistics device 303 to store the statistics information is not fixed, and a specific character strings may be as follows:

```
...
<question_info label="allmodule" total="10">
    <module name="contact">
        <question name="a contact person that is mostly contacted"
            answer="Zhang San. 13100000000; ..."
            priorty="1">
        </question>
        <question name="the number of contact persons"
            answer="100"
            priorty="2">
    </question>
    </module>
    <module name="message">
...
```

Following a question-info label, the total number of backup units is listed. Statistics information of each module corresponds to one module label, and each question label represents a question, where the question includes three parts, name, answer, and priority: name indicates a question name displayed for a user to see, answer is a correct answer to a corresponding question, and priority indicates a priority level of the statistics information. For instance, what is shown in the figure is contact, namely, a contact person module, and question name, namely, a question name, is "a contact person that is mostly contacted"; answer, namely, a correct answer to a corresponding question, is "Zhang San, 13100000000; . . . "; and priority indicates that a priority level of the question is "1". The priority level may be preset by the mobile terminal, and may also be defined by the user.

A storage 304 is configured to store the backup data and the statistics information of each block.

Figure 3:
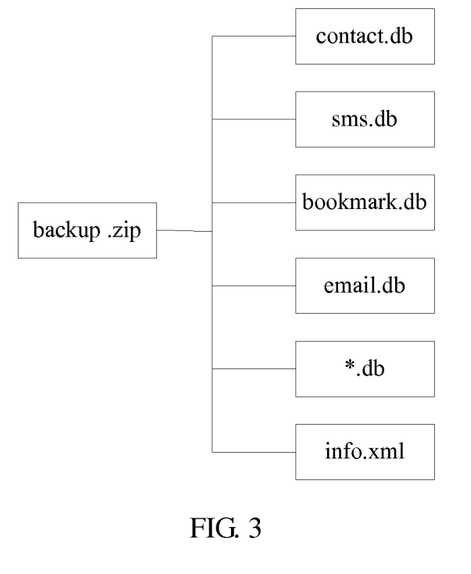
FIG. 3 is a schematic diagram of a backup file package instance according to an embodiment of the present invention.

The storage 304 may store the backup data and the statistics information in a backup file package. Specifically, the storage 304 may store the backup file package as a zip file package, whose file structure is shown in FIG. 3. The storage 304 may name the backup file package backup.zip, including several db files, such as contact.db, email.db, and bookmark.db, which correspond to the backup data of each block, and further including a configuration file info.xml, which corresponds to the statistics information of each block. The storage 304 may also separately store the backup data and the statistics information.

An input and output apparatus 305 is configured to interact with the user regarding information.

Specifically, the input and output apparatus 305 may include a screen, a keyboard, a touchscreen, a microphone, a speaker, and so on. The input and output apparatus 305 receives a data backup request from the user, and send the data backup request to the backup device. Further, through the input and output apparatus, the backup device and the statistics device may also interact with the user regarding backup details, for example, which data modules need to be backed up and a priority level of backup data.

Figure 7:
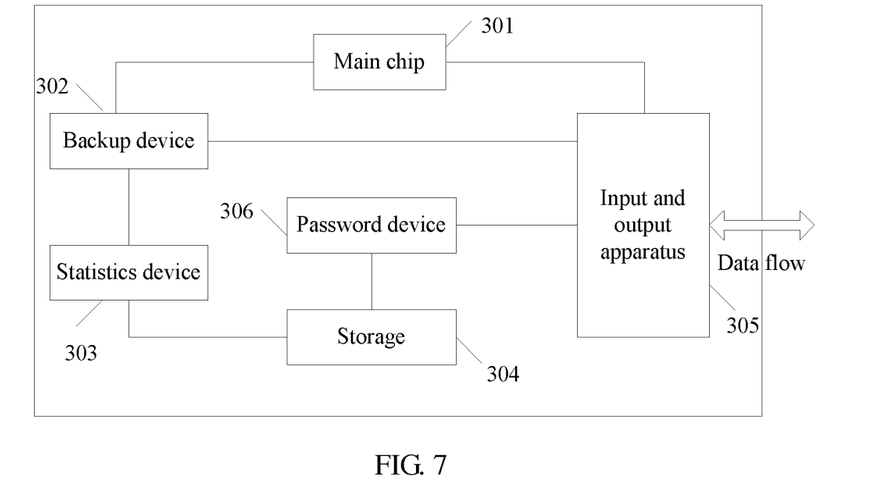
FIG. 7 is a schematic structural diagram of another mobile terminal according to an embodiment of the present invention.

Optionally, referring to FIG. 7, the mobile terminal may further include:

a password device 306, configured to set a password for the backup file and store the password.

A password that can be identified by the password device 306 may be any password form that is technically implementable at present, such as numerals, letters, fingerprints, and any combination of the foregoing several passwords. Specifically, after the backup data of each block is generated, the password device 306 may ask, through the input and output apparatus, the user whether a password needs to be set for the backup data, and if a password needs to be set for the backup data, set a password for the backup data generated by the backup device; or after the backup data of each block is scanned, the password device 306 may also ask, through the input and output apparatus, the user whether a password needs to be set for the backup data, and if a password needs to be set for the backup data, set a password for the backup data scanned by the statistics device; or after the backup data and the statistics information of each block are stored, the mobile terminal may ask, through the input and output apparatus, the user whether a password needs to be set for the backup data, and if a password needs to be set for the backup data, set a password for the backup data stored in the storage. In FIG. 7, that a password is set for the backup data after the backup data and the statistics information of each block are stored is taken as an example, and if a password needs to be set, the password device 306 stores, through the input and output apparatus 305, a password entered by the user.

It should be noted that, the backup device 302 and the statistics device 303 in the embodiment of the present invention may be implemented by using separate hardware modules, and may also be an integrated microprocessor, which is configured to implement backup and statistics functions at the same time, and may also be functional modules integrated in a main chip. If the password device 306 exists, the backup device 302, the statistics device 303, and the password device 306 in the embodiment of the present invention may be implemented by using separate hardware modules, and may also be an integrated microprocessor, which is configured to implement questioning, recovery, and password checking functions at the same time, and may also be functional modules integrated in a main chip.

In the embodiment of the present invention, an input and output apparatus 305 receives a data backup request and sends the data backup request to a backup device 302, the backup device 302 backs up information data in a main chip 301 by blocks and generates backup data of each block, a statistics device 303 scans the backup data of each block and generates statistics information, a storage 304 stores the backup data and the statistics information of each block, and a password device 305 stores a backup data password entered by a user. By applying the embodiment of the present invention, a method for data backup by blocks is implemented, so that the user may select, according to a user's requirement, data that needs to be backed up for backup.

Figure 8:
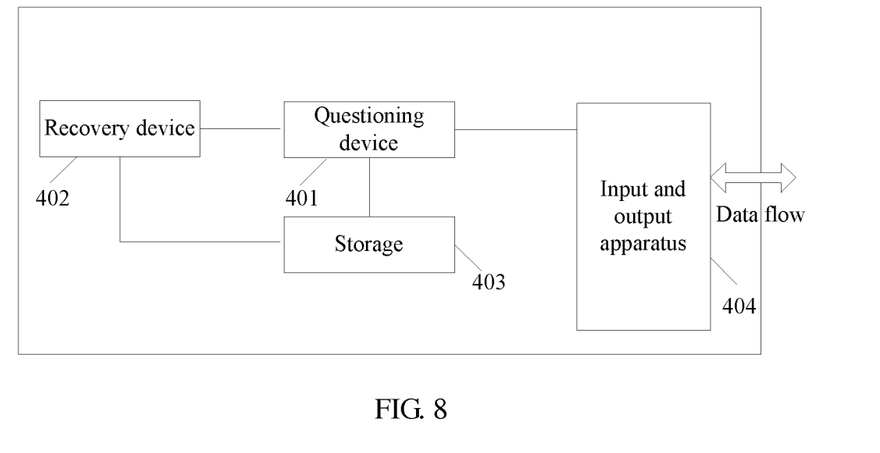
FIG. 8 is a schematic structural diagram of another mobile terminal according to an embodiment of the present invention.

Referring to FIG. 8, an embodiment of the present invention further provides a mobile terminal, where the mobile terminal includes, but is not limited to, a cell phone, a data card, and a palmtop computer, and includes:

A questioning device 401 is configured to ask, according to statistics information generated during data backup by blocks, a question for backup data of each block, where the backup data of each block is generated during data backup by blocks, and receive an answer to the question and compare the answer with corresponding statistics information, and if they match, send a data recovery instruction for backup data of a corresponding module to a recovery device.

Specifically, after receiving a data recovery request from an input and output apparatus 404, the questioning device 401 requests to obtain the statistics information from a storage 403, then parses the received statistics information, sends a question part of the statistics information to the input and output apparatus 404 for interaction with a user, and compares, according to the statistics information, the answer to the question entered by the user returned by the input and output apparatus 404. Specifically, if the answer to the question matches, the questioning device 401 sends a data recovery instruction for the backup data of the corresponding module to a recovery device 402. A more optimized method is that if a priority level is set for each question when the statistics information is generated during data backup, a corresponding question of each block may be asked of the user according to a sequence of the priority level, so that the recovery device 402 can recover the backup data of each block level by level. Further, the certain sequence may also be determined by the user. For instance, before a question is asked, the questioning device displays a backup data list to the user according to content of the statistics information through a screen of the input and output apparatus 403, and the user selects a backup data module that needs to be recovered and correspondingly selects a sequence for answering the question. In this way, the user may only recover the backup data module that needs to be recovered, and may not recover other backup data modules that do not need to be recovered or are inconvenient for recovery, which improves operability of the solution.

The recovery device 402 is configured to perform a recovery operation on the corresponding backup data when the data recovery instruction is received.

After receiving the data recovery instruction, the recovery device obtains the corresponding backup data from the storage and performs the recovery operation.

The storage 403 is configured to store the backup data and the statistics information of each block.

The storage 403 may store the backup data and the statistics information in a backup file package. Specifically, the storage 403 may store the backup file package as a zip file package, whose file structure is shown in FIG. 3. The storage 404 may name the backup file package backup.zip, including several db files, such as contact.db, email.db, and bookmark.db, which correspond to the backup data of each block, and further including a configuration file info.xml, which corresponds to the statistics information of each block. The storage 403 may also separately store the backup data and the statistics information.

The input and output apparatus 404 is configured to interact with the user regarding information.

The input and output apparatus 404 may include a screen, a keyboard, a touchscreen, a microphone, a speaker, and so on. The input and output apparatus receives the data recovery request from the user, and sends the data recovery request to the questioning device 401, and interacts with the user regarding information, such as the answer to the question entered by the user, which is described in detail in the embodiment and is not described herein again.

Figure 9:
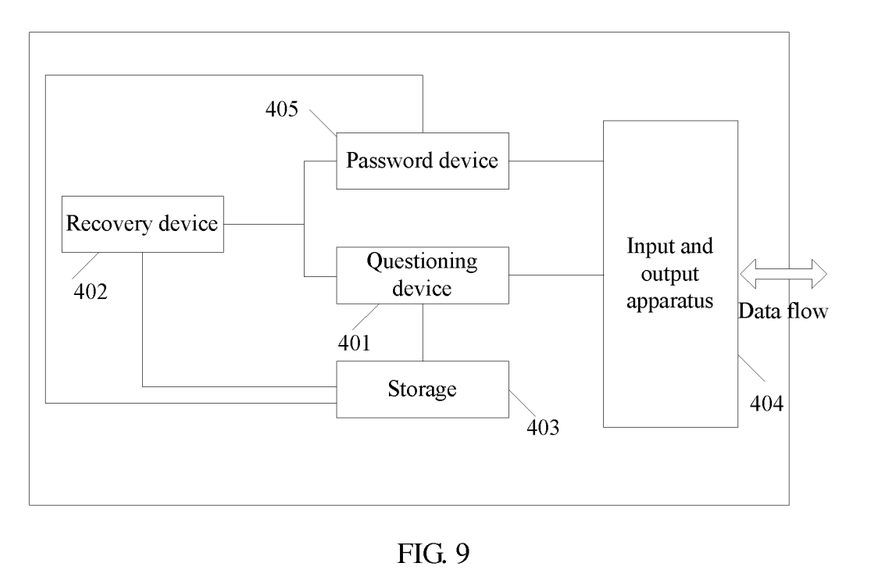
FIG. 9 is a schematic structural diagram of another mobile terminal according to an embodiment of the present invention.

Optionally, referring to FIG. 9, the mobile terminal may further include:

a password device 405, configured to check a password with the user before the questioning device asks a question.

First, it should be noted that in FIG. 9, that the password device sets a password for the backup data after the backup data and the statistics information of each block are stored is taken as an example. After the input and output apparatus receives the data recovery request, if a password is set for the backup data during data backup by blocks, the input and output apparatus 404 first sends the data recovery request to the password device 405, and the password device 405 checks the password entered by the user, and if the password matches, the password device 405 sends the data recovery instruction to the recovery device 402 to instruct the recovery device 402 to perform a data recovery operation on all the backup data. If the password does not match, the password device 405 sends the data recovery request to the questioning device 401, and the questioning device 401 asks a question for the backup data of each block according to the statistics information stored in the storage 403, and the backup data is recovered block by block according to a questioning result.

It should be noted that, the questioning device 401 and the recovery device 402 in the embodiment of the present invention may be implemented by using separate hardware modules, and may also be an integrated microprocessor, which is configured to implement questioning and recovery functions at the same time, and may also be functional modules integrated in a main chip. If the password device 405 exists, the questioning device 401, the recovery device 402, and the password device 405 in the embodiment of the present invention may be implemented by using separate hardware modules, and may also be an integrated microprocessor, which is configured to implement questioning, recovery, and password checking functions at the same time, and may also be functional modules integrated in a main chip.

In the embodiment of the present invention, an input and output apparatus 404 receives a data recovery request and first sends the data recovery request to a password device 405, and the password device 405 checks whether a password entered by a user matches through the input and output apparatus 404, and if the password matches, the password device 405 instructs a recovery device 402 to recover all backup data; if the password does not match, the password device 405 instructs a questioning device 401 to ask a question, and the questioning device 401 extracts statistics information of a backup file from a storage 403 and parses the statistics information, sends a question of the statistics information to the input and output apparatus 404, and checks an answer to the question entered by the user, and if the answer to the question and the statistics information match, the questioning device 401 instructs the recovery device 402 to perform a recovery operation on backup data of a corresponding module.

Figure 10:
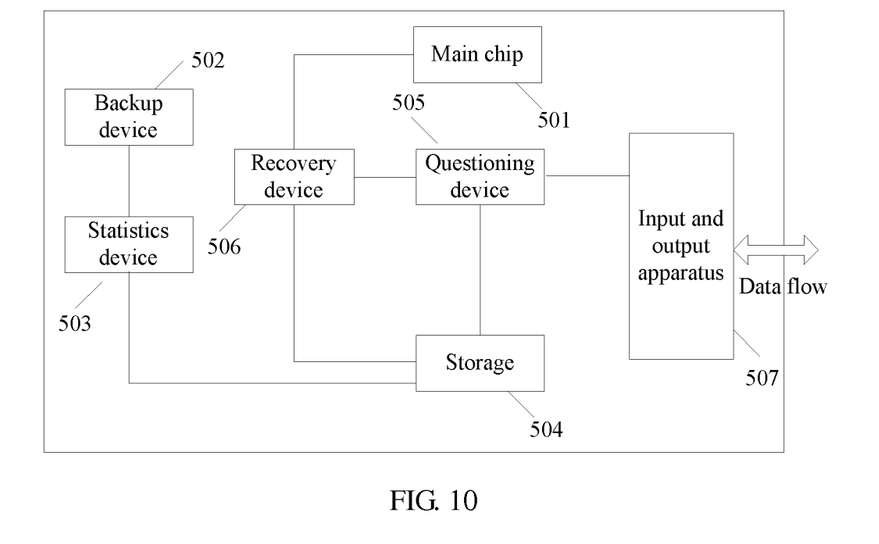
FIG. 10 is a schematic structural diagram of another mobile terminal according to an embodiment of the present invention.

Referring to FIG. 10, an embodiment of the present invention provides a mobile terminal, where the mobile terminal includes, but is not limited to, a cell phone, a data card, or a palmtop computer, and includes:

A main chip 501 is configured to implement a basic function of the mobile terminal.

A backup device 502 is configured to obtain information data from the main chip of the mobile terminal, and back up the information data by blocks and generate backup data of each block.

Specifically, after receiving a backup request from a user, the backup device 502 may divide the information data of the mobile terminal into a plurality of modules, such as contact persons, call record blocks, short messages, Internet records, mailboxes, multimedia messages, and setting parameters, and store the information data as backup data files by modules, such as db files. A more optimized manner is that the backup device 502 may define a range of each information module according to a user's habit and requirement, and that which part of the information data needs to be backed up and which part of the information data does not need to be backed up may both be defined by the user and be implemented by the backup device 502. For instance, the mobile terminal may be set to back up information data of a contact person module and a short message module, and information data of other modules is not backed up. In this way, the user can back up information data according to a user's requirement.

A statistics device 503 is configured to scan the backup data of each block and generate statistics information.

After a backup data file of each block is generated, the statistics device 503 scans all the backup data files generated by the backup device 502 and automatically generates some statistics information, where the statistics information of each block includes a question and an answer based on the backup data of each block. Specifically, according to properties of different modules, the statistics information may be:

contact persons: a contact person that is mostly contacted; the number of contact persons; groups which exist, and so on;

short messages: persons that short message interaction involves; persons that short message interaction mostly involves, and so on;

call records: a contact person with whom a call duration is the longest; time of a latest call record, and so on;

Internet records: most frequently visited websites; stored bookmarks, and so on;

mailboxes: a website to which a mailbox account belongs; a password of a certain mailbox account, and so on;

multimedia messages: the latest video recording time and duration; the number of the saved pictures, and so on; and setting parameters: preset time of an alarm clock, and so on.

The statistics device 503 may store the statistics information in a form of key-value pairs as extensible markup language (Extensible Markup Language, xml) files, hyper text mark-up language (Hyper Text Mark-up Language, html) files and other files that can record text information, and a more optimized manner is that the statistics device 503 may define a priority level for the statistics information according to importance of the statistics information. A manner for the statistics device 503 to store the statistics information is not fixed, and a specific character strings may be as follows:

```
...
<question_info label="allmodule" total="10">
    <module name="contact">
        <question name="a contact person that is mostly contacted"
            answer="Zhang San. 13100000000; ..."
            priorty="1">
        </question>
        <question name="the number of contact persons"
            answer="100"
            priorty="2">
    </question>
    </module>
    <module name="message">
    ...
```

Following a question-info label, the total number of backup units is listed. Statistics information of each module corresponds to one module label, and each question label represents a question, where the question includes three parts, name, answer, and priority: name indicates a question name displayed for a user to see, answer is a correct answer to a corresponding question, and priority indicates a priority level of the statistics information. For instance, what is shown in the figure is contact, namely, a contact person module, and question name, namely, a question name, is "a contact person that is mostly contacted"; answer, namely, a correct answer to a corresponding question, is "Zhang San, 13100000000; . . . "; and priority indicates that a priority level of the question is "1". The priority level may be preset by the mobile terminal, and may also be defined by the user.

A storage 504 is configured to store the backup data and the statistics information of each block.

The storage 504 may store the backup data and the statistics information in a backup file package. Specifically, the storage 504 may store the backup file package as a zip file package, whose file structure is shown in FIG. 3. The storage 504 may name the backup file package backup.zip, including several db files, such as contact.db, email.db, and bookmark.db, which correspond to the backup data of each block, and further including a configuration file info.xml, which corresponds to the statistics information of each block. The storage 504 may also separately store the backup data and the statistics information.

A questioning device 505 is configured to ask, according to the statistics information, a question for the backup data of each block, and receive an answer to the question and compare the answer with corresponding statistics information, and if they match, send a data recovery instruction for backup data of a corresponding module to a recovery device.

Specifically, after receiving a data recovery request from an input and output apparatus 507, the questioning device 505 requests to obtain the statistics information from the storage 504, then parses the received statistics information, sends a question part of the statistics information to the input and output apparatus 507 for interaction with a user, and compares, according to the statistics information, the answer to the question entered by the user returned by the input and output apparatus 507. Specifically, if the answer to the question matches, the questioning device 505 sends a data recovery instruction for the backup data of the corresponding module to the recovery device 506. A more optimized method is that if the statistics device sets a priority level for each question when the statistics information is generated during data backup, a corresponding question of each block may be asked of the user according to a sequence of the priority level, so that the recovery device 506 can recover the backup data of each block level by level. Further, the certain sequence may also be determined by the user. For instance, before a question is asked, the questioning device displays a backup data list to the user according to content of the statistics information through a screen of the input and output apparatus 507, and the user selects a backup data module that needs to be recovered and correspondingly selects a sequence for answering the question. In this way, the user may only recover the backup data module that needs to be recovered, and may not recover other backup data modules that do not need to be recovered or are inconvenient for recovery, which improves operability of the solution. The recovery device 506 is configured to perform a recovery operation on the corresponding backup data when the data recovery instruction is received.

After receiving the data recovery instruction, the recovery device 506 obtains the corresponding backup data from the storage 504 and performs the recovery operation.

The input and output apparatus 507 is configured to interact information with the user.

The input and output apparatus 507 may include a screen, a keyboard, a touchscreen, a microphone, a speaker, and so on. The input and output apparatus 507 receives the data backup request and the data recovery request from the user, and interacts with the user regarding information, such as the answer to the question entered by the user, which is described in detail in the embodiment and is not described herein again.

Figure 11:
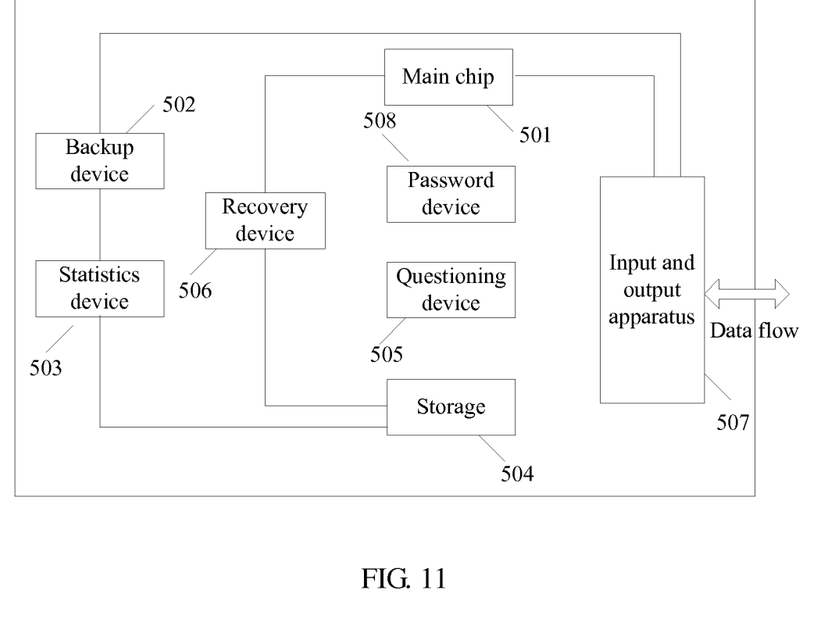
FIG. 11 is a schematic structural diagram of another mobile terminal according to an embodiment of the present invention.

Optionally, referring to FIG. 11, the mobile terminal may further include:

a password device 508, configured to set a password for the backup file and store the password, and check the password with the user before the questioning device asks a question.

After the backup data of each block is generated, or the backup data of each block is scanned, or that the backup data and the statistics information of each block are stored, the mobile terminal may ask the user whether a password needs to be set for the backup data, and if a password needs to be set, the password device 508 stores a password entered by the user through the input and output apparatus 507. It should be noted that in FIG. 11, that the password device sets a password for the backup data after the backup data and the statistics information of each block are stored is taken as an example. After the input and output apparatus 507 receives the data recovery request, if a password is set for the backup data during data backup by blocks, the input and output apparatus 507 first sends the data recovery request to the password device 508, and the password device 508 checks the password entered by the user, and if the password matches, the password device 508 sends the data recovery instruction to the recovery device 506 to instruct the recovery device 506 to perform a data recovery operation on all the backup data. If the password does not match, the password device 508 sends the data recovery request to the questioning device 505, and the questioning device 505 asks a question for the backup data of each block according to the statistics information stored in the storage 504, and the backup data is recovered block by block according to a questioning result.

In this embodiment, an input and output apparatus 507 obtains a data backup request and sends the data backup request to a backup device 502, the backup device 502 backs up information data of a main chip by blocks and generates backup data, and a statistics device 503 scans the backup data and generates statistics information of each block, a storage 504 stores the backup data and the statistics information, and a password device 508 records a backup data password entered by a user. After the input and output apparatus receives a data recovery request, first the password device 508 checks, through the input and output apparatus 507, whether a password entered by the user matches, and if the password matches, the password device 508 instructs a recovery device 506 to recover all the backup data; if the password does not match, the password device 508 instructs a questioning device 505, and the questioning device 505 extracts statistics information of a backup file from the storage 504 and parses the statistics information, sends a question part of the statistics information to the input and output apparatus 507, and checks an answer to the question entered by the user, and if the answer to the question and the statistics information match, the questioning device 505 instructs the recovery device 506 to recover backup data of a module corresponding to the question. By applying the embodiment, the user can answer a corresponding question depending on user's familiarity with backup data in a case that a password is forgotten and cannot be found, or fingerprint password verification fails or the like, so as to recover the backup data block by block, preventing important information data loss and improving backup file security.

It should be noted that, the backup device 502, the statistics device 503, the questioning device 505, and the recovery device 506 in the embodiment of the present invention may be implemented by using separate hardware modules, and may also be an integrated microprocessor, which is configured to implement backup, statistics, recovery, and questioning functions at the same time, and may also be functional modules integrated in a main chip. If the password device 508 exists, the backup device 502, the statistics device 503, the questioning device 505, the recovery device 506, and the password device 508 in the embodiment of the present invention may be implemented by using separate hardware modules, and may also be an integrated microprocessor, which is configured to implement questioning, recovery, and password checking functions at the same time, and may also be functional modules integrated in a main chip.

Through the descriptions of the foregoing implementation manners, a person skilled in the art may be clearly aware that the present invention may be implemented in a manner of software plus a necessary general hardware platform, and definitely, may also be implemented by using hardware, but in most cases, the former one is a preferred implementation manner. Based on such understanding, the technical solutions of the present invention essentially, or the part contributing to the prior art may be implemented in a form of a software product. The computer software product is stored in a readable storage medium, for example, a floppy disk, a hard disk, or an optical disk of a computer, and includes several instructions for instructing a computer device (which may be a personal computer, a server, a network device, or the like) to execute the methods described in the embodiments of the present invention.

The foregoing embodiments are only provided for describing the technical solutions of the present invention, but not intended to limit the present invention. Although the present invention is described in detail with reference to the foregoing embodiments, a person of ordinary skill in the art should understand that they may still make modifications to the technical solutions recorded in each of the foregoing embodiments, or equivalent replacements to a part of technical features in the technical solutions; however, these modifications or replacements do not make the essence of the corresponding technical solutions depart from the spirit and scope of the technical solutions in each of the embodiments of the present invention.

The objectives, technical solutions, and beneficial effects of the present invention are further described in detail in the foregoing specific implementation manners. It should be understood that the foregoing descriptions are merely specific implementation manners of the present invention, but are not intended to limit the protection scope of the present invention. Any modification, equivalent replacement, or improvement made within the spirit and principle of the present invention shall fall within the protection scope of the present invention.

What is claimed is:

1. A data backup method for a mobile terminal, comprising:
   receiving a data backup request;
   backing up, in response to the data backup request, information data by blocks, and generating backup data of each block;
   scanning the backup data of each block, and generating, for each block, corresponding statistics information of the backup data, wherein the statistics information for each block comprises a question and an answer corresponding to the backup data corresponding to the statistics information, and the question and the answer are generated from the statistics information, wherein the statistics information further comprises at least one of contact person information of the mobile terminal, messaging history of the mobile terminal, call history of the mobile terminal, internet history of the mobile terminal, and multimedia history of the mobile terminal,
   the question for a first block of backup data among the blocks of backup data is generated by the mobile terminal by analyzing the statistics information corresponding to the first block of backup data, the generated question relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, and
   the answer for the generated question for the first block of backup data is generated by the mobile terminal by analyzing the statistics information corresponding to the first block of backup data, the generated answer relating to the at least one of contact person information of the mobile terminal, messaging history of the mobile terminal, call history of the mobile terminal, internet history of the mobile terminal, and multimedia history of the mobile terminal from the statistics information corresponding to the first block of backup data;
   storing in the mobile terminal the backup data and the corresponding statistics information of each block, the backup data and the corresponding statistics information being stored in association with each other;
   in response to receiving a data recovery request for the first block of backup data among the blocks of backup data, asking the generated question; and
   in response to a user answer being provided to the generated question, determining whether the user answer matches the generated answer and issuing a data recovery instruction based upon the determination.

2. The method according to claim 1, wherein the statistics information further comprises a recovery priority level of the backup data of each block according to importance of the statistics information.

3. The method according to claim 1, comprising setting a password for the backup data of each block.

4. The method according to claim 1, wherein the backing up information data by blocks comprises:
   dividing the information data into a contact person module, a call record block, a short message module, an Internet record block, a mailbox module, a multimedia message module, and a setting parameter module for backup.

5. The method according to claim 1, wherein the backing up information data by blocks further comprises:
   presetting, by a mobile terminal, a dividing range of data modules, or defining, by a user, a dividing range of data modules.

6. The method according to claim 1, wherein the storing the backup data and the statistics information of each block comprises:
   storing the backup data and the statistics information of each block as one backup file, or storing the backup data and the statistics information separately.

7. A data recovery method for a mobile terminal, comprising:
   receiving a data recovery request;
   asking, in response to the data recovery request and according to statistics information generated during data backup by blocks, a question for backup data of each block, the backup data of each block being generated during data backup by blocks and corresponding to the statistics information, the question having been generated by the mobile terminal from the statistics information, and the backup data and the corresponding statistics information being stored in association with each other in the mobile terminal;

receiving a user answer to the question;

comparing the received user answer with an answer generated by the mobile terminal from the corresponding statistics information;

determining if the received user answer matches the answer generated by the mobile terminal; and upon the match being determined, performing a recovery operation on the backup data by issuing a data recover instruction, wherein the statistics information further comprises at least one of contact person information of the mobile terminal, messaging history of the mobile terminal, call history of the mobile terminal, internet history of the mobile terminal, and multimedia history of the mobile terminal, the question for a first block of backup data among the blocks of backup data is generated by the mobile terminal by analyzing the statistics information corresponding to the first block of backup data, the generated question relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, and the answer generated by the mobile terminal for the generated question for the first block of backup data is generated by analyzing the statistics information corresponding to the first block of backup data, the answer generated by the mobile terminal relating to the at least one of contact person information of the mobile terminal, messaging history of the mobile terminal, call history of the mobile terminal, internet history of the mobile terminal, and multimedia history of the mobile terminal from the statistics information corresponding to the first block of backup data.

8. The method according to claim 7, wherein the asking the question for backup data of each block comprises:

determining whether the statistics information comprises a recovery priority level of the backup data of each block;

asking, when the statistics information comprises a recovery priority level, the question in a sequence according to the recovery priority level; and asking, when the statistics information does not comprise a recovery priority level, the question successively according to a sequence selected by a user.

9. The method according to claim 8, wherein the asking the question successively according to a sequence selected by a user comprises:

selecting, by the user, module data to be recovered; and selecting, by the user, a questioning sequence of the module data to be recovered.

10. The method according to claim 7, wherein after the receiving a data recovery request and before the asking the question for backup data of each block, the method further comprises:

determining whether a password is set for the backup data, and upon determining the password is set:

prompting for password entry;

determining whether the set password matches the entered password;

performing, upon determining the set password matches the entered password, the data recovery operation on the backup data; and performing, upon determining the set password does not match the entered password, the asking the question for the backup data of each block according to the statistics information.

11. The method according to claim 7, further comprising upon determining the received user answer to the question is wrong, not performing the recovery operation on backup data of a corresponding module.

12. A mobile terminal, comprising:

at least one hardware processor to implement:

a backup device, configured to, in response to receiving a data backup request, obtain information data from a main chip of the mobile terminal, and back up the information data by blocks and generate backup data of each block;

a statistics device, configured to, in response to completion of the generation of the backup data, scan the backup data of each block and generate corresponding statistics information of the backup data, and generate a question and an answer from the statistics information, wherein the statistics information further comprises at least one of contact person information of the mobile terminal, messaging history of the mobile terminal, call history of the mobile terminal, internet history of the mobile terminal, and multimedia history of the mobile terminal, the statistics device is configured to generate the question for a first block of backup data among the blocks of backup data by analyzing the statistics information corresponding to the first block of backup data, the generated question relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, and the statistics device is configured to generate the answer for the generated question for the first block of backup data by analyzing the statistics information corresponding to the first block of backup data, the generated answer relating to the at least one of contact person information of the mobile terminal, messaging history of the mobile terminal, call history of the mobile terminal, internet history of the mobile terminal, and multimedia history of the mobile terminal from the statistics information corresponding to the first block of backup data;

a storage, configured to store the backup data and the corresponding statistics information of each block, the backup data and the corresponding statistics information being stored in association with each other; and an input terminal, configured to receive a data backup request and send the data backup request to the backup device, wherein in response to the input terminal receiving a data recovery request for the first block of backup data among the blocks of backup data, the at least one hardware processor is configured to ask the generated question, and in response to a user answer being provided to the generated question through the input terminal, the at least one hardware processor is configured to determine whether the user answer matches the generated answer and to issue a data recovery mobile terminal, call history of the mobile terminal, internet history of the mobile terminal, and multimedia history of the mobile terminal from the statistics information corresponding to the first block of backup data, and the statistics device is configured to generate an answer for the generated question for the first block of backup data by analyzing the statistics information corresponding to the first block of backup data, the generated answer relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, a recovery device, configured to, when receiving a data recovery instruction, perform a recovery operation on the backup data stored in the storage and corresponding to the data recovery instruction;

a questioning device, configured to:
in response to the IO terminal receiving a data recovery request for the first block of backup data among the blocks of backup data, ask, using the IO terminal, the question generated for the first block of backup data by the statistics device, instruction based upon the determination.

13. The mobile terminal according to claim 12, wherein the at least one hardware processor further implements a password device, configured to set a password for the backup data and store the password.

14. A mobile terminal, comprising:
an input and output (IO) terminal;
a storage;
at least one hardware processor interfaced to the storage and the IO terminal, and configured to implement:
a statistics device configured to generate a question from statistics information generated from backup data stored in the storage which was generated during data backup by blocks, the statistics information corresponding to the backup data, being scanned from the backup data, and stored in association with the backup data in the storage,
wherein
the statistics information comprises at least one of contact person information of the mobile terminal, messaging history of the mobile terminal, call history of the mobile terminal, internet history of the mobile terminal, and multimedia history of the mobile terminal,
the statistics device is configured to generate the question for a first block of backup data among the blocks of backup data by analyzing the statistics information corresponding to the first block of backup data, the generated question relating to the at least one of contact person information of the mobile terminal, messaging history of the
receive a user answer to the question through the IO terminal,
compare the received user answer with the answer generated by the statistics device, and
upon determining a match between the answer generated by the statistics device and the received user answer, send the data recovery instruction for backup data of a corresponding module to the recovery device to cause the performing the recovery operation.

15. The mobile terminal according to claim 14, wherein the at least one hardware processor is further configured to implement a password device, configured to:
check a password with the user before the questioning device asks a question,
upon determining that the password matches a set password, instructing the recovery device to recover the backup data by sending the data recovery instruction; and
upon determining that the password does not match the set password, instructing the questioning device to question the user.

16. The mobile terminal according to claim 14, wherein:
upon determining the statistics information comprises a recovery priority level of the backup data of each block, the questioning device asks a question in a sequence according to the recovery priority level; and
upon determining the statistic information does not comprise the recovery priority level of the back data of each block, the questioning device asks the question successively according to backup data that needs to be recovered and a corresponding questioning sequence that are selected by the user.

17. A mobile terminal, comprising:
an input and output (IO) terminal;
a storage; and
at least one hardware processor interfaced to the storage and the IO terminal, and configured to implement:
a backup device, configured to, in response to receiving a data backup request, obtain information data from a main chip of the mobile terminal, and back up the information data by blocks and generate backup data of each block, the backup data being stored in the storage;
a statistics device, configured to:
in response to completion of the generation of the backup data, scan the backup data of each block, and generate corresponding statistics information of the backup data, the corresponding statistics information being stored in the storage in association with the backup data, the statistics information comprising at least one of contact person information of the mobile terminal, messaging history of the mobile terminal, call history of the mobile terminal, internet history of the mobile terminal, and multimedia history of the mobile terminal,
generate a question for a first block of backup data among the blocks of backup data by analyzing the statistics information corresponding to the first block of backup data, the generated question relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, and
generate an answer for the generated question for the first block of backup data by analyzing the statistics information corresponding to the first block of backup data, the generated answer relating to the at least one of contact person information of the mobile terminal, messaging history of the mobile terminal, call history of the mobile terminal, internet history of the mobile terminal, and multimedia history of the mobile terminal from the statistics information corresponding to the first block of backup data;

a recovery device, configured to, when receiving a data recovery instruction, perform a recovery operation on the backup data stored in the storage which corresponds to the data recovery instruction; and a questioning device, configured to:
  ask, in response to receiving a data recovery request for the first block of backup data among the blocks of backup data via the IO terminal, the question generated for the first block of backup data by the statistics device,
  receive a user answer to the question from a user through the IO terminal,
  compare the user answer with the answer generated by the statistics device, and
  upon determining a match between the answer generated by the statistics device and the received user answer, issue the data recovery instruction for backup data of a corresponding module to the recovery device to cause the performing the recovery operation.

18. The mobile terminal according to claim 17, wherein the at least one hardware processor is further configured to implement a password device, configured to:
  set a password for the backup data and store the password, and
  check the set password against a password entered by the user with the IO terminal before the questioning device asks the question,
  upon determining the set password matches the password entered by the user, instruct the recovery device to recover the backup data by sending the data recovery instruction;
  upon determining the set password does not match the password entered by the user, instruct the questioning device to question the user.

19. The mobile terminal according to claim 17, wherein:
  upon determining the statistics information comprises a recovery priority level of the backup data of each block, the questioning device asks the question in a sequence according to the recovery priority level; and
  upon determining the statistics information does not comprise the recovery priority level of the backup data of each block, the questioning device asks the question successively according to backup data that needs to be recovered and a corresponding questioning sequence that are selected by the user.

* * * * *

UNITED STATES PATENT AND TRADEMARK OFFICE
CERTIFICATE OF CORRECTION

PATENT NO. : 10,095,715 B2  
APPLICATION NO. : 14/057337  
DATED : October 9, 2018  
INVENTOR(S) : Wei Yin et al.

Page 1 of 2

It is certified that error appears in the above-identified patent and that said Letters Patent is hereby corrected as shown below:

In the Claims

Column 15, Line 58:
In Claim 1, before "scanning", insert -- in response to completion of the generating of the backup data. --.

Column 15, Line 64:
In Claim 1, after "generated", insert -- by the mobile terminal --.

Column 19, Lines 5-30:
In Claim 12, after "recovery", delete "mobile terminal, call history of the mobile terminal, internet history of the mobile terminal, and multimedia history of the mobile terminal from the statistics information corresponding to the first block of backup data, and the statistics device is configured to generate an answer for the generated question for the first block of backup data by analyzing the statistics information corresponding to the first block of backup data, the generated answer relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, a recovery device, configured to, when receiving a data recovery instruction, perform a recovery operation on the backup data stored in the storage and corresponding to the data recovery instruction; a questioning device, configured to: in response to the IO terminal receiving a data recovery request for the first block of backup data among the blocks of backup data, ask, using the IO terminal, the question generated for the first block of backup data by the statistics device,".

Column 19, Line 61:
In Claim 14, after "messaging history of the", insert -- mobile terminal, call history of the mobile terminal, internet history of the mobile terminal, and multimedia history of the mobile terminal from the statistics information corresponding to the first block of backup data, and the statistics device is configured to generate an answer for the generated question for the first block of backup data by analyzing the statistics information corresponding to the first block of backup data, the generated Signed and Sealed this  
Second Day of July, 2019

Andrei Iancu  
*Director of the United States Patent and Trademark Office* answer relating to the at least one of contact person information of the mobile terminal, messaging history of the mobile terminal, call history of the mobile terminal, internet history of the mobile terminal, and multimedia history of the mobile terminal from the statistics information corresponding to the first block of backup data, a recovery device, configured to, when receiving a data recovery instruction, perform a recovery operation on the backup data stored in the storage and corresponding to the data recovery instruction; a questioning device, configured to: in response to the IO terminal receiving a data recovery request for the first block of backup data among the blocks of backup data, ask, using the IO terminal, the question generated for the first block of backup data by the statistics device, --.